(12) United States Patent
Xing et al.

(10) Patent No.: US 12,185,302 B2
(45) Date of Patent: Dec. 31, 2024

(54) FEEDBACK CHANNEL MAPPING METHOD AND APPARATUS, DEVICE, AND STORAGE MEDIUM

(71) Applicant: ZTE Corporation, Guangdong (CN)

(72) Inventors: Weimin Xing, Shenzhen (CN); Youxiong Lu, Shenzhen (CN); Jin Yang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 257 days.

(21) Appl. No.: 17/671,165

(22) Filed: Feb. 14, 2022

(65) Prior Publication Data

US 2022/0264601 A1 Aug. 18, 2022

Related U.S. Application Data

(63) Continuation of application No. PCT/CN2020/109441, filed on Aug. 17, 2020.

(30) Foreign Application Priority Data

Aug. 16, 2019 (CN) .......................... 201910757794.9

(51) Int. Cl.
*H04W 72/1263* (2023.01)
(52) U.S. Cl.
CPC ................................ *H04W 72/1263* (2013.01)
(58) Field of Classification Search
CPC ................................................. H04W 72/1263
See application file for complete search history.

(56) References Cited

U.S. PATENT DOCUMENTS

| 8,638,880 B2 | 1/2014 | Baldemair et al. |
| 2021/0112505 A1 | 4/2021 | Li et al. |

(Continued)

FOREIGN PATENT DOCUMENTS

| CN | 108400843 A | 8/2018 |
| CN | 109691146 A | 4/2019 |

(Continued)

OTHER PUBLICATIONS

3GPP TSG RAN WG1 #97, R1-1906209, Reno, USA, May 13-17, 2019, Source: NTT Docomo, Inc. Title: NR Sidelink Physical Layer Procedure ,Agenda Item:7.2.4.5 Document for: Discussion and Decision, (Year: 2019).*

(Continued)

*Primary Examiner* — Abdeltif Ajid
(74) *Attorney, Agent, or Firm* — Crowell & Moring LLP

(57) ABSTRACT

Provided are a feedback channel mapping method and device, equipment and a storage medium. The method includes: determining the number of feedback channel groups divided in a first configured frequency domain in a first slot; determining the number of data channels mapped to the first configured frequency domain in the first slot, where a time domain interval between the first slot and a second slot where the data channel is located is greater than or equal to a first configured value, the second slot is a forward slot of the first slot, and a frequency domain range where the data channel is located is a second configured frequency domain; and mapping a feedback channel corresponding to each data channel to the feedback channel group according to the number of the data channels and the number of the feedback channel groups.

17 Claims, 3 Drawing Sheets

(56) References Cited

U.S. PATENT DOCUMENTS

| | | | |
|---|---|---|---|
| 2021/0329431 A1* | 10/2021 | Su | .................. H04L 5/0094 |
| 2022/0030598 A1 | 1/2022 | Li | |
| 2022/0110097 A1* | 4/2022 | Zhao | .................. H04L 1/1812 |

FOREIGN PATENT DOCUMENTS

| | | |
|---|---|---|
| CN | 109891981 A | 6/2019 |
| CN | 110536465 A | 12/2019 |
| EP | 3 911 067 A1 | 11/2021 |
| RU | 2680752 C2 | 12/2015 |
| WO | WO 2018063059 A1 | 4/2018 |
| WO | WO 2019/103673 A1 | 5/2019 |
| WO | WO 2019/151915 A1 | 8/2019 |
| WO | WO 2021/032038 A1 | 2/2021 |

OTHER PUBLICATIONS

ZTE et al., "Feature lead summary for agenda item 7.2.4.5 Physical layer procedures for sidelink", 3GPP TSG RAN WG1 #97, R1-1907682, May 13-17, 2019, 26p, US.

Extended European Search Report for corresponding application No. EP 20854560.8 dated Aug. 9, 2023, 10p.

NTT Docomo, Inc. "NR Sidelink Physical Layer Procedure", 3GPP TSG-RAN, WG1 Meeting #97, R1-1906209, dated May 17, 2019, 12p, US.

Huawei et al., "Sidelink physical layer procedures for NR V2X", 3GPP TSG RAN WG1 Meeting #97, R1-1906008, May 17, 2019, 23p, US.

Huawei et al., "Design and contents of PSCCH and PSFCH", 3GPP TSG RAN WG1, Meeting #97, R1-1906596, May 17, 2019, 12p, US.

Office Action for corresponding Russian application No. 2022105174 dated Nov. 28, 2023, 4p, in Russian language.

English language translation of Office Action for corresponding Russian application No. 2022105174 dated Nov. 28, 2023, 3p.

Search Report for corresponding Russian application No. 2022105174 dated Nov. 27, 2023, 2p, in Russian language.

English language translation of Search Report for corresponding Russian application No. 2022105174 dated Nov. 27, 2p.

International Search Report for priority application No. PCT/CN2020/109441 dated Oct. 28, 2020, 6p, in Chinese language and English languages.

Written Opinion of the International Searching Authority for priority application No. PCT/CN2020/109441 dated Oct. 28, 2020, 4p, in Chinese language.

Zte et al., "Discussion on PHY procedures for sidelink," 3GPP TSG RAN WG1 #98 bis R1-1910299, Oct. 14-20, 2019, 11p, China.

Zte et al., "NR sidelink physical layer structure," 3GPP TSG RAN WG1 #97 R1-1906457, May 13-17, 2019, 12p, U.S.

Zte et al., "Discussion on PHY procedures for sidelink," 3GPP TSG RAN WG1 #97 R1-1906469, May 13-17, 2019, 6p, U.S.

Concise Explanation of Relevance for A10.

Office Action mailed Jul. 12, 2024 for Japanese Patent Application No. 2022-509055 with English translation (5 pages).

Examination Report dispatched Jun. 27, 2024 for Indian Patent Application No. 202217005617, English translation included (7 pages).

Office Action mailed Sep. 27, 2024 for Chinese Patent Application No. 2019107577949 with English translation (21 pages).

Intel Corporation, "On HARQ feedback support for groupcast," 3GPP TSG-RAN WG2 Meeting 106, R2-1906427, May 17, 2019, 3 pages.

Communication pursuant to Article 94(3) EPC issued in European Application No. 20 854 560.8 dated Oct. 8, 2024, 5 pages.

* cited by examiner

FEEDBACK CHANNEL MAPPING METHOD AND APPARATUS, DEVICE, AND STORAGE MEDIUM

This application is a continuation application of International Application No. PCT/CN2020/109441, filed Aug. 17, 2020, which claims priority to Chinese Patent Application No. 201910757794.9 filed with the CNIPA Aug. 16, 2019, the disclosures of both of which are incorporated herein by reference in their entireties.

TECHNICAL FIELD

The present application relates to wireless communication networks, for example, to a feedback channel mapping method and device, equipment and a storage medium.

BACKGROUND

In a sidelink communication system, when services need to be transmitted between user equipments (UEs), service data between UEs is not forwarded by the network side, but is directly transmitted by a data source UE to a target UE through the sidelink. In the sidelink communications, the UE obtains resources from a configured or pre-configured resource pool to perform communication. The resource pool generally corresponds to a group of time-frequency resources, and in the related art, such a group of time-frequency resources may be continuous or discrete in the time domain, and also may be continuous or discrete in the frequency domain. For the sidelink, there are two resource selection modes for the UE to select a resource from the resource pool for transmission: one is that sidelink resources are allocated by a base station, i.e., the scheduling-based resource allocation scheme; and the other is that the UE autonomously detects the resource usage situation of the resource pool and selects the resources for communication, i.e., the UE autonomous acquisition-based resource scheme.

As the demands for direct communications increase, the sidelink is required to support more types of services, such as those where the receiver needs to send feedback information to the sender. When the sidelink needs to support feedback, the sidelink resource pool in the resource pool in the related art is required to include feedback channel resources. However, in the technical discussion, the correspondence between feedback resources and data channel resources in the resource pool is not yet specified, so that conflicts are easy to occur during feedback resource allocation.

SUMMARY

The present application provides a feedback channel mapping method and device, equipment and a storage medium, to solve the problem of conflicts occurring during feedback resource allocation.

The embodiments of the present application provide a feedback channel mapping method. The method includes steps described below.

The number of feedback channel groups divided in a first configured frequency domain in a first slot is determined.

The number of data channels mapped to the first configured frequency domain in the first slot is determined, where a time domain interval between the first slot and a second slot where the data channels are located is greater than or equal to a first configured value, the second slot is a forward slot of the first slot, and a frequency domain range where the data channels are located is a second configured frequency domain.

Corresponded feedback channels of each of data channels are mapped to the feedback channel groups according to the number of the data channels and the number of the feedback channel groups.

The embodiments of the present application provide a feedback channel mapping device. The device includes a feedback channel group number determination module, a data channel number determination module, and a feedback channel mapping module.

The feedback channel group number determination module is configured to determine the number of feedback channel groups divided in a first configured frequency domain in a first slot.

The data channel number determination module is configured to determine the number of data channels mapped to the first configured frequency domain in the first slot, where a time domain interval between the first slot and a second slot where the data channels are located is greater than or equal to a first configured value, the second slot is a forward slot of the first slot, and a frequency domain range where the data channels are located is a second configured frequency domain.

The feedback channel mapping module is configured to map feedback channel(s) corresponding to each data channel to the feedback channel groups according to the number of the data channels and the number of the feedback channel groups.

The embodiments of the present application provide a communication equipment. The communication equipment includes a memory, a processor, and a computer program stored in the memory and executable by the processor. The processor, when executing the computer program, implements the feedback channel mapping method described in any one of the embodiments of the present application.

The embodiments of the present application provide a storage medium. The storage medium is configured to store a computer program which, when executed by a processor, implements the feedback channel mapping method described in any one of the embodiments of the present application.

DETAILED DESCRIPTION

The embodiments of the present application will be described below in detail with reference to the drawings.

The physical slots refer to slots divided over physical time, and all slots have slots over physical time. Sidelink candidate slots refer to slots in the physical slots that can or may be used for sidelink communication. Slots included in the resource pool refer to available slots in one resource pool, and the slots in the resource pool are a sub-set of the sidelink candidate slots.

In one embodiment, the bandwidth of a resource pool includes L subchannels, and if one sub channel includes Y resource blocks (RBs) in the frequency domain, the resource pool includes L*YRBs in the frequency domain. Generally, a data channel used by the UE to send data includes at least one subchannel in the frequency domain. The resource pool consists of multiple slots in the time domain, and these slots may be continuous or discontinuous over physical time. Generally, a data channel resource used by the UE to send data consists of at least one symbol in at least one slot in the time domain.

In one embodiment, a first slot is a slot in the resource pool, which is configured with feedback channels. Assuming that the period of the first slot is N, N is the interval between two adjacent first slots in which the feedback channel is located, and the interval is the number of slots in a resource pool included between the two adjacent first slots, i.e., there is one slot configured with feedback channels every N slots in the resource pool. The feedback channel in the time domain may include at least one symbol in one slot, and at least one symbol is located on the tail of this slot. In one embodiment, the length of a feedback channel resource in the time domain is equal to the length of one slot.

Figure 1:
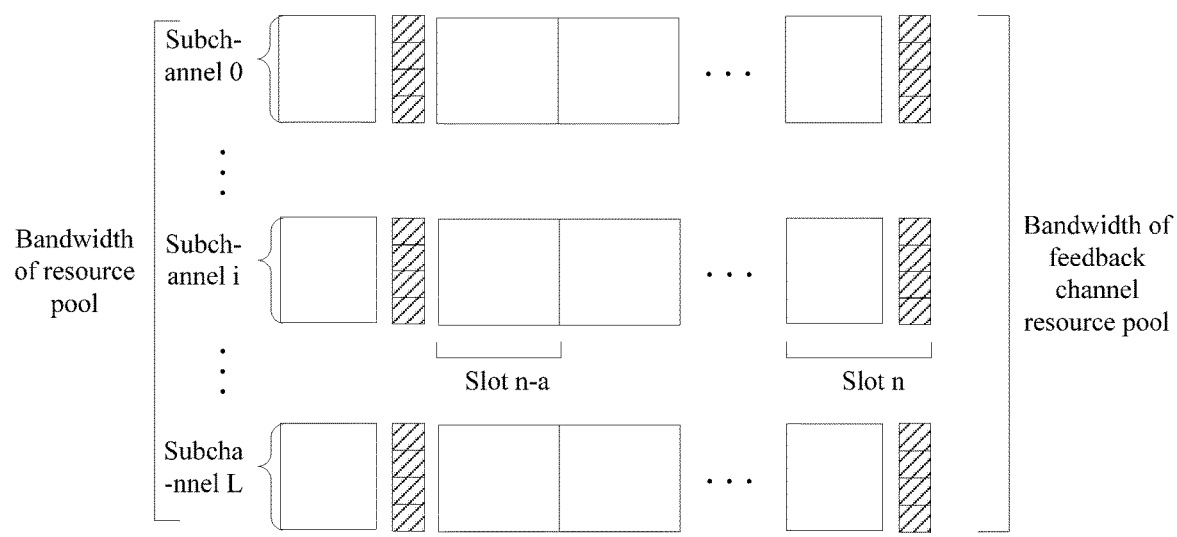
FIG. 1 is a diagram showing allocation of data channels and feedback channels of a resource pool in the time and frequency domains according to an embodiment of the present application.
Figure 2:
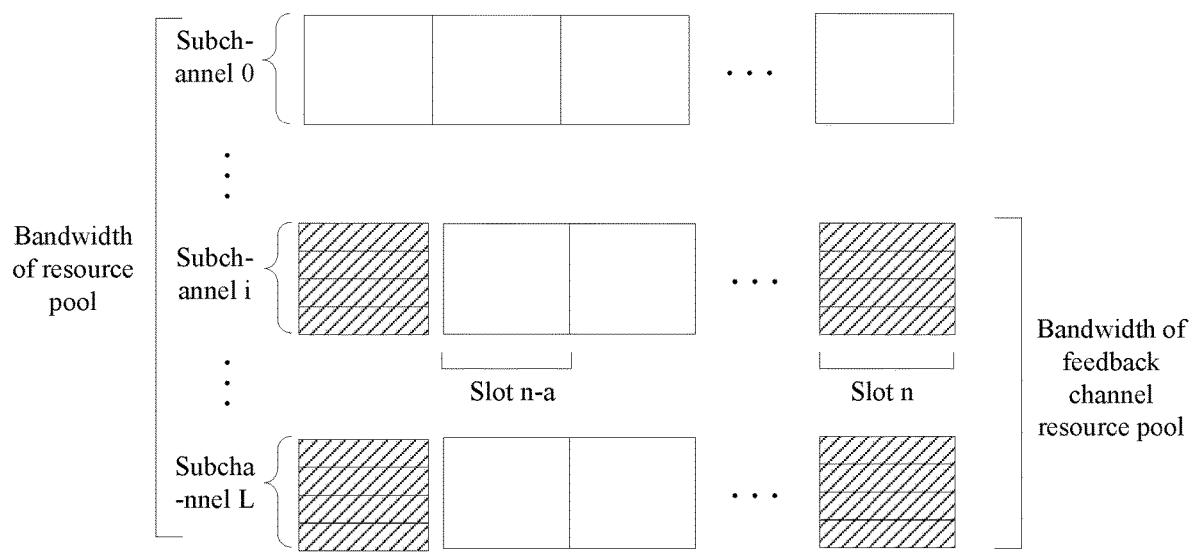
FIG. 2 is a diagram showing another allocation of data channels and feedback channels of a resource pool in the time and frequency domains according to an embodiment of the present application.
Figure 3:
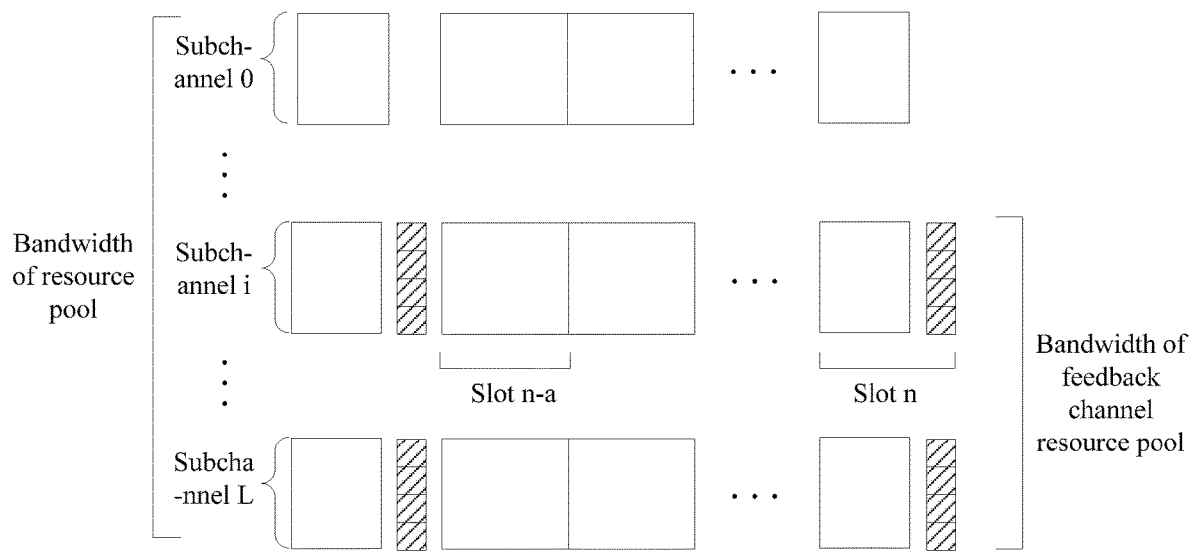
FIG. 3 is a diagram showing another allocation of data channels and feedback channels of a resource pool in the time and frequency domains according to an embodiment of the present application.

In one embodiment, a total bandwidth of feedback channels in the resource pool may be equal to, less than, or greater than the bandwidth of the resource pool. The number of RBs occupied by the minimum frequency domain bandwidth of one feedback channel is configured by a network side node, or is pre-configured or pre-defined by a network. In one embodiment, one feedback channel is further divided into a certain number of feedback channels in the code domain, and such a certain number is also configured by the network side node, or is pre-configured or pre-defined by the network. FIGS. 1 to 3 are diagrams showing allocation of data channels and feedback channels of the resource pool in the time and frequency domains according to the present application.

In one embodiment, assuming that a first configured frequency domain of a slot n is configured with feedback channels, a slot n-a where data channels mapped to the first configured frequency domain in the first slot are located meets the following conditions: a is greater than or equal to a first configured value K, and only the slot n is configured with feedback channels in the interval from the slot n−a+K to the slot n, where K is the minimum physical slot interval between a resource of a data channel and a feedback channel corresponding to this data channel, and is configured by the network side or is pre-configured or pre-defined by the network.

Figure 4:
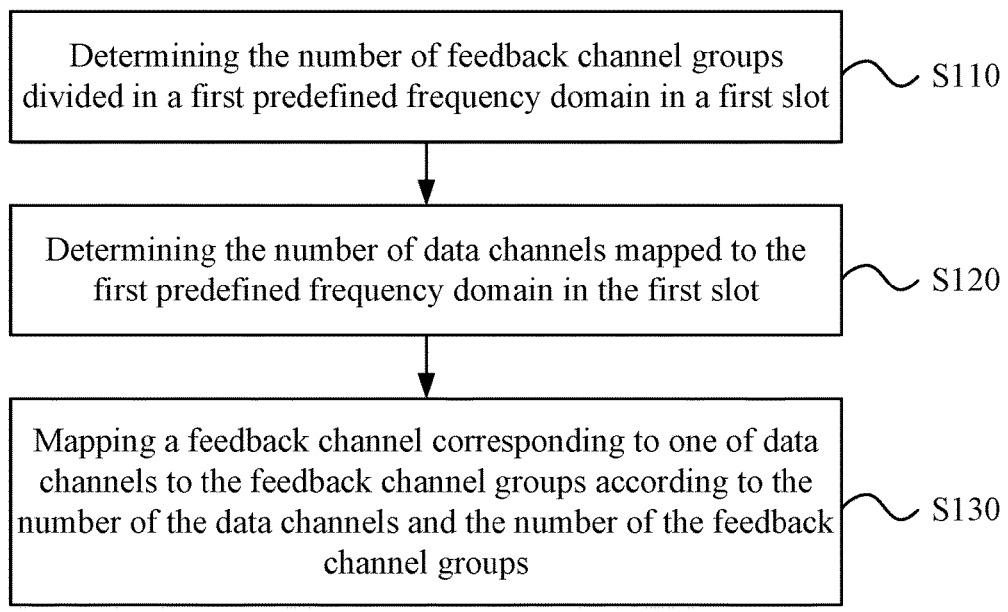
FIG. 4 is a flowchart of a feedback channel mapping method according to an embodiment of the present application.

FIG. 4 is a flowchart of a feedback channel mapping method according to an embodiment of the present application. This embodiment is suitable for the case of mapping feedback channels. This embodiment may be implemented by a terminal. The terminal may be a scheduling node (e.g., a base station, an access node, etc.,) or a UE. As shown in FIG. 4, the method provided in this embodiment includes steps S110 to S130.

In S110, the number of feedback channel groups divided in a first configured frequency domain in a first slot is determined.

In S120, the number of data channels mapped to the first configured frequency domain in the first slot is determined.

In the above step, a time domain interval between the first slot and a second slot where the data channels are located is greater than or equal to a first configured value, the second slot is a forward slot of the first slot, and a frequency domain range where the data channels are located is a second configured frequency domain.

In S130, feedback channels corresponding to each data channels are mapped to the feedback channel groups according to the number of the data channels and the number of the feedback channel groups.

The first configured frequency domain and the second configured frequency domain may be the same or different. The first slot and the second slot are configured as a slot in a resource pool.

In one embodiment, the number of feedback channel groups is determined in any one of the following manners: determining the number of feedback channel groups according to the number of data channels mapped to the first configured frequency domain in the first slot; determining the number of feedback channel groups according to a configuration of a network side node or a pre-configuration of a network; or determining the number of feedback channel groups according to the first configured frequency domain in the first slot.

The manner of determining the number of feedback channel groups according to the first configured frequency domain in the first slot may be as follows: configuring or pre-configuring the feedback channel groups in the first configured frequency domain, or configuring or pre-configuring the number of feedback channels included in each feedback channel group.

In one embodiment, the second slot where the data channels are located may be determined in the following manner: determining a slot in a first time period as the second slot, a time interval between the slot and a first slot of a current cycle being greater than or equal to the first configured value, where the first time period is a time period between a first slot of a previous cycle and the first slot of the current cycle, a cycle is an interval between two adjacent first slots where the feedback channels are located, and the interval is the number of slots in the resource pool included between the two adjacent first slots; and if the first configured value is greater than 0, determining all slots in a second time period as the second slot, where the second time period is a time period between a slot which is located forward for the first configured value from the first slot of the previous cycle and the first slot of the previous cycle, and the first configured value is a physical slot interval.

In one embodiment, assuming that the two adjacent first slots are a first slot n and a first slot n−j, respectively, there are (N−1) slots of the resource pool between the first slot n and the first slot n−j, and if the time domain interval between a slot of the resource pool within the time period [first slot n−j, first slot n] and the first slot n is greater than or equal to K physical slots, the feedback channel of the data channel of this slot of the resource pool is mapped to the first slot n, and feedback channels of data channel resources of all slots of the resource pool within the time [first slot n−j−K, first slot n−j] are mapped to the first slot n. In one embodiment, when K is equal to 0, [slot n−j−K, slot n−j] is an empty set, and within this time period, there is no slot mapped to the first slot n. Let the number of second slots meeting the conditions be J. It can be seen that when K is equal to 0, J is equal to N; and when K is greater than 0, J is less than or equal to N+K−1. That is, in one resource pool, feedback channels of data channel resources of J second slots are mapped to the first slot n.

In one embodiment, the first configured frequency domain and the second configured frequency domain are a frequency domain range of one subchannel in the resource pool, and the first configured frequency domain and the second configured frequency domain are the same subchannel frequency domain range. The number of feedback channel groups may be determined according to the number of data channels mapped to the first configured frequency domain in the first slot in the following manner: determining the number of data channels mapped to the first configured frequency domain in the first slot or the maximum number of data channels capable of being mapped to the first configured frequency domain in the first slot as the number of feedback channel groups.

In one embodiment, when the first configured value K is equal to 0, the maximum number of data channels capable of being mapped to the first configured frequency domain in the first slot is equal to the period N of the first slot, and the period N of the first slot is determined as the number of feedback channel groups; and when the first configured value K is greater than 0, the maximum number of data channels capable of being mapped to the first configured frequency domain in the first slot is less than or equal to N+K−1, and the number of feedback channel groups is an integer less than or equal to N+K−1. That is, the number of data channels capable of being mapped to the first configured frequency domain in the first slot is the number of second slots or the number of data channels capable of being mapped to the first configured frequency domain in the first slot is N+K−1.

In one embodiment, the manner of determining the number of feedback channel groups according to the first configured frequency domain in the first slot may be as follows: determining the number of feedback channels according to the number of resource blocks included in one subchannel and the number of resource blocks included in one feedback channel, or determining the number of feedback channels according to the number of resource blocks included in one subchannel, the number of resource blocks included in one feedback channel, and the number of channels of one feedback channel in a code domain; and determining the number of feedback channels as the number of feedback channel groups.

In one embodiment, assuming that the minimum bandwidth of one feedback channel is X RBs and one subchannel includes Y RBs, the number of feedback channels in the frequency domain is $\lfloor Y/X \rfloor$. In one embodiment, one feedback channel whose bandwidth is X RBs may be further divided into Z feedback channels, and the number of feedback channels of one subchannel in the code domain is $$\left\lfloor \frac{Y}{X} \right\rfloor \cdot Z.$$

The determined number of feedback channel groups may be $$\left\lfloor \frac{Y}{X} \right\rfloor \text{ or } \left\lfloor \frac{Y}{X} \right\rfloor \cdot Z.$$

In one embodiment, feedback channels included in each feedback channel group may be equal or not. Assuming that the number of feedback channel groups is M, feedback channels included in the first configured frequency domain in the first slot are divided into M groups. In one embodiment, one subchannel includes $$\left\lfloor \frac{Y}{X} \right\rfloor$$

feedback channels in the frequency domain, and then the $$\left\lfloor \frac{Y}{X} \right\rfloor$$

feedback channels are divided M groups. In one embodiment, one subchannel includes $$\left\lfloor \frac{Y}{X} \right\rfloor \cdot Z$$

feedback channels in the code domain, and then the $$\left\lfloor \frac{Y}{X} \right\rfloor \cdot Z$$

feedback channels are divided M groups.

In one embodiment, assuming that the number of data channels mapped to the first configured frequency domain in the first slot is I, feedback channels corresponding to I data channels are mapped to at least one of the M feedback channel groups.

In one embodiment, the feedback channel(s) corresponding to each data channel may be mapped to the feedback channel groups according to the number of the data channels and the number of the feedback channel groups in the following manner: ordering data channels, and ordering feedback channel groups; and mapping a feedback channel corresponding to each ordered data channel to the feedback channel groups.

In one embodiment, the feedback channel corresponding to each ordered data channel may be mapped to the feedback channel groups in the following manner: if the number of data channels is equal to or less than the number of feedback channel groups, mapping the feedback channel(s) corresponding to each data channel to a respective one of the feedback channel groups in order until all the data channels are mapped, and if the number of data channels is less than the number of feedback channel groups, mapping the feedback channel(s) corresponding to each data channel to a respective one of the feedback channel groups in order, and after the data channels are mapped, starting with the first one of the data channels again, mapping the feedback channel(s) corresponding to each data channel to a respective one of remaining feedback channel groups until each feedback channel group has the mapped feedback channel; or determining the number of feedback channel groups to which the feedback channel(s) corresponding to each data channel is mapped according to the number of data channels and the number of feedback channel groups, and mapping, according to the number of feedback channel groups to which the feedback channel(s) corresponding to each data channel is mapped, the feedback channel(s) corresponding to each ordered data channel to at least one feedback channel group.

Exemplarily, if M is greater than or equal to I, I ordered data channels are one-to-one mapped to M feedback channel groups in order, where the feedback channel of the first data channel is mapped to the first feedback channel group, until the I data channels are mapped.

Exemplarily, if M is greater than I, I ordered data channels are one-to-one mapped to M feedback channel groups in order until the feedback channel of an Ith data channel is mapped to an Ith feedback channel group, and then the feedback channel of the first data channel continues to be mapped to an (I+1)th feedback channel group, and so on until each of M feedback channel groups has the mapped feedback channel.

Exemplarily, if M is greater than I, for the first to (M mod I)th data channels, the feedback channel of each data channel is mapped to $$\left\lceil \frac{M}{I} \right\rceil$$

feedback channel groups, for example, the feedback channel of the first data channel is mapped to the first to $$\left\lceil \frac{M}{I} \right\rceil$$

feedback channel groups, and so on. For the (M mod I)+1th to Ith data channels, the feedback channel(s) corresponding to each data channel is mapped to $$\left\lfloor \frac{M}{I} \right\rfloor$$

feedback channel groups.

In one embodiment, the first configured frequency domain is a total bandwidth of all feedback channels in the resource pool, and the second configured frequency domain is a total bandwidth of all data channels in the resource pool. The first configured frequency domain and the second configured frequency domain may be the same or different.

In one embodiment, the number of feedback channel groups may be determined according to the number of data channels mapped to the first configured frequency domain in the first slot in the following manner: determining the number of data channels mapped to the first configured frequency domain in the first slot or the maximum number of data channels capable of being mapped to the first configured frequency domain in the first slot as the number of feedback channel groups.

The number of data channels mapped to the first configured frequency domain in the first slot is determined in the following manner: if the number of subchannels included in each second slot is equal, determining the number of data channels mapped to the first configured frequency domain in the first slot according to the number of second slots and the number of subchannels included in each second slot; and if the number of subchannels included in each second slot is different, summing the number of subchannels included in each second slot, and determining the resulting sum as the number of data channels mapped to the first configured frequency domain in the first slot.

Exemplarily, assuming that the number of second slots is J and that the number of data channels included in each second slot is equal and is L, the number of data channels mapped to the first configured frequency domain in the first slot is I=L*J. The number of data channels included in the second slot may be equal to or less than the number of subchannels of the resource pool.

If the number of data channels included in each second slot is unequal, the number of data channels mapped to the first configured frequency domain in the first slot is $$I = \sum_{j=1}^{J} L_j,$$

where $L_j$ is the number of data channels included in a jth second slot.

In one embodiment, when the first configured value K is equal to 0, the maximum number of data channels capable of being mapped to the first configured frequency domain in the first slot is equal to N*L, where N is the period of the first slot, and L is the number of subchannels included in the resource pool, and then the number of feedback channel groups is determined as N*L. When K is greater than 0, the maximum number of data channels capable of being mapped to the first configured frequency domain in the first slot is less than or equal to (N+K−1)*L, and then the number of feedback channel groups is less than or equal to (N+K−1)*L.

In one embodiment, the manner of determining the number of feedback channel groups according to the first configured frequency domain in the first slot may be as follows: determining the number of feedback channels according to the number of resource blocks included in the total bandwidth of all feedback channels in the resource pool and the number of resource blocks included in one feedback channel, or determining the number of feedback channels according to the number of resource blocks included in the total bandwidth of all feedback channels in the resource pool, the number of resource blocks included in one feedback channel, and the number of channels of one feedback channel in a code domain; and determining the number of feedback channels as the number of feedback channel groups.

Exemplarily, assuming that the total bandwidth of all feedback channels in the resource pool is B RBs, the minimum bandwidth of one feedback channel in the frequency domain is X RBs, and then the number of feedback channels capable of being divided of the first slot in the frequency domain is $$\left\lfloor \frac{B}{X} \right\rfloor.$$

One feedback channel whose frequency domain bandwidth is X RBs may be further divided into Z feedback channels, and the number of feedback channels capable of being divided of the first slot in the code domain is $$\left\lfloor \frac{B}{X} \right\rfloor \cdot Z.$$

In this manner, the number of feedback channel groups is $$\left\lfloor \frac{B}{X} \right\rfloor \text{ or } \left\lfloor \frac{B}{X} \right\rfloor \cdot Z.$$

In one embodiment, feedback channels included in each feedback channel group may be equal or not. Assuming that the number of feedback channel groups is M, feedback channels included in the first configured frequency domain in the first slot are divided into M groups. In one embodiment, the first slot includes $$\left\lfloor \frac{B}{X} \right\rfloor$$

feedback channels in the frequency domain, and then the $$\left\lfloor \frac{B}{X} \right\rfloor$$

feedback channels are divided M groups. In one embodiment, the first slot includes $$\left\lfloor \frac{B}{X} \right\rfloor \cdot Z$$

feedback channels in the code domain, and then the $$\left\lfloor \frac{B}{X} \right\rfloor \cdot Z$$

feedback channels are divided M groups.

In one embodiment, the feedback channel(s) corresponding to each data channel may be mapped to the feedback channel groups according to the number of the data channels and the number of the feedback channel groups in the following manner: ordering data channels, and ordering feedback channel groups; and mapping a feedback channel corresponding to each ordered data channel to the feedback channel groups.

In one embodiment, the feedback channel corresponding to each ordered data channel may be mapped to the feedback channel groups in the following manner: if the number of data channels is equal to or less than the number of feedback channel groups, mapping the feedback channel(s) corresponding to each data channel to a respective one of the feedback channel groups in order until all the data channels are mapped, and if the number of data channels is less than the number of feedback channel groups, mapping the feedback channel(s) corresponding to each data channel to a respective one of the feedback channel groups in order, and after the data channels are mapped, starting with the first one of the data channels again, mapping the feedback channel(s) corresponding to each data channel to a respective one of remaining feedback channel groups until each feedback channel group has the mapped feedback channel; or determining the number of feedback channel groups to which the feedback channel(s) corresponding to each data channel is mapped according to the number of data channels and the number of feedback channel groups, and mapping, according to the number of feedback channel groups to which the feedback channel(s) corresponding to each data channel is mapped, the feedback channel corresponding to each ordered data channel to at least one feedback channel group.

Exemplarily, assuming that the number of data channels is I and that the number of feedback channel groups is M, if M is greater than or equal to I, I ordered data channels are one-to-one mapped to M feedback channel groups in order, where the feedback channel of the first data channel is mapped to the first feedback channel group, until the I data channels are mapped.

Exemplarily, if M is greater than I, I ordered data channels are one-to-one mapped to M feedback channel groups in order until the feedback channel of an Ith data channel is mapped to an Ith feedback channel group, and then the feedback channel of the first data channel continues to be mapped to an (I+1)th feedback channel group, and so on until each of M feedback channel groups has the mapped feedback channel.

Exemplarily, if M is greater than I, for the first to (M mod I)th data channels, the feedback channel of each data channel is mapped to $$\left\lceil \frac{M}{I} \right\rceil$$

feedback channel groups, for example, the feedback channel of the first data channel is mapped to the first to $$\left\lceil \frac{M}{I} \right\rceil$$

feedback channel groups, and so on. For the (M mod I)+1th to Ith data channels, the feedback channel(s) corresponding to each data channel is mapped to $$\left\lfloor \frac{M}{I} \right\rfloor$$

feedback channel groups.

In one embodiment, the feedback channel corresponding to each ordered data channel may be mapped to the feedback channel groups in the following manners: according to the number of the data channels and the number of the feedback channel groups in the following manner: determining an ordering number of a feedback channel group to which the feedback channel(s) corresponding to each data channel is mapped according to the number of second slots and the number of data channels included in a second configured frequency domain in each second slot, and mapping the feedback channel(s) corresponding to each data channel to the feedback channel groups according to the ordering number.

Exemplarily, assuming that the number of data channels included in each of J second slots is equal and is L, an ordering number of a feedback channel group corresponding to one data channel is L*j+l, where j is a number of the second slot where this data channel is located among the J second slots, and l is an ordering number of the frequency domain where this data channel is located or a subchannel number.

Exemplarily, when each of J second slots includes one data channel on one subchannel, an ordering number of a feedback channel group corresponding to one data channel is J+l+j, where j is a number of the second slot where this data channel is located among the J second slots, and l is an ordering number of the frequency domain where this data channel is located or a sub channel number.

In one embodiment, the feedback channel(s) corresponding to each data channel may be mapped to the feedback channel groups in the following manners: ordering second slots, and ordering feedback channel groups; mapping each ordered second slot to the feedback channel groups; for at least one feedback channel group to which a current second slot is mapped, dividing feedback channels included in the at least one feedback channel group into the set number of sub-feedback channel groups, where the set number is determined by the number of data channels of the current second slot in the second configured frequency domain and/or the number of the feedback channels included in the at least one feedback channel group; and mapping feedback channels corresponding to the current second slot to the sub-feedback channel groups, where the feedback channels corresponding to the second slot are feedback channels corresponding to data channels included in the second slot in the second configured frequency domain.

In one embodiment, the manner of determining the number of feedback channel groups is the same as the manner in which the first configured frequency domain is the total bandwidth of all feedback channels in the resource pool, and what has been described is not repeated herein. The manner of determining the number of sub-feedback channels as the set number is similar to the manner of determining the feedback channel groups, and what has been described is not repeated herein.

In one embodiment, each ordered second slot may be mapped to the feedback channel groups in the following manner: in response to the number of second slots being equal to or less than the number of feedback channel groups, mapping each second slot to a respective one of the feedback channel groups in order until the second slots are mapped, and in response to the number of second slots being less than the number of feedback channel groups, mapping each second slot to a respective one of the feedback channel groups in order, and after the second slots are mapped, starting with the first one of the second slots again, mapping each second slot to a respective one of remaining feedback channel groups until each feedback channel group has the mapped second slot; or determining the number of feedback channel groups to which each second slot is mapped according to the number of second slots and the number of feedback channel groups, and mapping, according to the number of feedback channel groups to which each second slot is mapped, each ordered second slot to at least one feedback channel group.

Exemplarily, assuming that the number of second slots is J and the number of feedback channel groups is M, if M is greater than or equal to J, J ordered second slots are one-to-one mapped to M feedback channel groups in order, where the first one of the second slots is mapped to the first feedback channel group, until the J second slots data are mapped.

Exemplarily, if M is greater than J, J ordered second slots are one-to-one mapped to M feedback channel groups in order until the feedback channel of a Jth second slot is mapped to a Jth feedback channel group, and then the first one of the second slots continues to be mapped to a (J+1)th feedback channel group, and so on until each of M feedback channel groups has the mapped second slot.

Exemplarily, if M is greater than J, for the first to (M mod I)th second slots, each second slot is mapped to $$\left\lceil \frac{M}{I} \right\rceil$$

feedback channel groups, for example, the first second slot is mapped to the first to $$\left\lceil \frac{M}{I} \right\rceil$$

feedback channel groups, and so on. For the (M mod I)+1th to Jth second slots, each second slot is mapped to $$\left\lfloor \frac{M}{I} \right\rfloor$$

feedback channel groups.

In one embodiment, the feedback channels corresponding to the current second slot may be mapped to the sub-feedback channel groups in the following manner: ordering data channels of the current second slot, and ordering sub-feedback channel groups; and mapping feedback channels corresponding to the ordered data channels of the current second slot to the sub-feedback channel groups.

In one embodiment, feedback channels corresponding to the ordered data channels of the current second slot may be mapped to the sub-feedback channel groups in the following manner: in response to the number of data channels of the current second slot being equal to or less than a set number, mapping feedback channel(s) corresponding to each data channel of the current second slot to a respective one of the sub-feedback channel groups in order until the feedback channels corresponding to the current second slot are mapped, and in response to the number of data channels of the current second slot being less than the set number, mapping the feedback channel(s) corresponding to each data channel of the current second slot to a respective one of the sub-feedback channel groups in order, and after the feedback channels corresponding to the current second slot are mapped, starting with a feedback channel corresponding to the first one of the data channels of the current second slot again, mapping the feedback channel(s) corresponding to each data channel of the current second slot to each of remaining sub-feedback channel groups until each sub-feedback channel group has the mapped feedback channel.

Exemplarily, assuming that the number of data channels included in the current second slot or the number of sub-channels is Lj and that the number of sub-feedback channel groups is Nj, Lj data channels are mapped to at least one of the Nj sub-feedback channel groups.

Exemplarily, the manner in which data channels are mapped to the sub-feedback channel groups according to magnitudes of Nj and Lj is the same as the manner in which data channels are mapped to the feedback channel groups according to magnitudes of M and I, and what has been described is not repeated herein.

Figure 5:
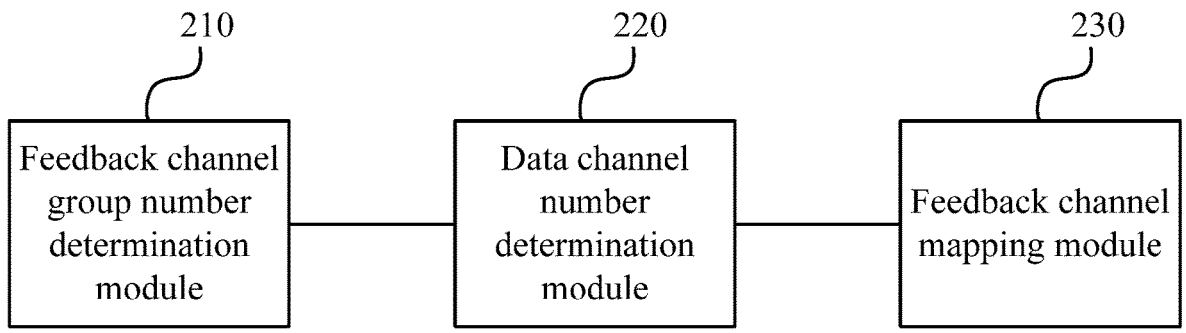
FIG. 5 is a structural diagram of a feedback channel mapping device according to an embodiment of the present application.

FIG. 5 is a structural diagram of a feedback channel mapping device according to an embodiment of the present application. As shown in FIG. 5, the device includes a feedback channel group number determination module 210, a data channel number determination module 220, and a feedback channel mapping module 230.

The feedback channel group number determination module 210 is configured to determine the number of feedback channel groups divided in a first configured frequency domain in a first slot. The data channel number determination module 220 is configured to determine the number of data channels mapped to the first configured frequency domain in the first slot, where a time domain interval between the first slot and a second slot where the data channels are located is greater than or equal to a first configured value, the second slot is a forward slot of the first slot, and a frequency domain range where the data channels are located is a second configured frequency domain. The feedback channel mapping module 230 is configured to map feedback channels corresponding to data channels to the feedback channel groups according to the number of the data channels and the number of the feedback channel groups.

In one embodiment, the feedback channel group number determination module 210 is further configured to determine the number of feedback channel groups according to the number of data channels mapped to the first configured frequency domain in the first slot; determine the number of feedback channel groups according to a configuration of a network side node or a pre-configuration of a network; or determine the number of feedback channel groups according to the first configured frequency domain in the first slot.

In one embodiment, the first slot and the second slot are configured as a slot in a resource pool, and the second slot where the data channels are located is determined according to the following steps: determining a slot in a first time period as the second slot, a time interval between the slot and a first slot of a current cycle being greater than or equal to the first configured value, where the first time period is a time period between a first slot of a previous cycle and the first slot of the current cycle, a cycle is an interval between two adjacent first slots where the feedback channels are located, and the interval is the number of slots in the resource pool included between the two adjacent first slots; and if the first configured value is greater than 0, determining all slots in a second time period as the second slot, where the second time period is a time period between a slot which is located forward for the first configured value from the first slot of the previous cycle and the first slot of the previous cycle, and the first configured value is a physical slot interval.

In one embodiment, the first configured frequency domain and the second configured frequency domain are a frequency domain range of one subchannel in the resource pool.

In one embodiment, the feedback channel group number determination module 210 is further configured to determine the number of feedback channels according to the number of resource blocks included in one subchannel and the number of resource blocks included in one feedback channel, or determine the number of feedback channels according to the number of resource blocks included in one subchannel, the number of resource blocks included in one feedback channel, and the number of channels of one feedback channel in a code domain, and determine the number of feedback channels as the number of feedback channel groups.

In one embodiment, the first configured frequency domain is a total bandwidth of all feedback channels in the resource pool, and the second configured frequency domain is a total bandwidth of all data channels in the resource pool.

In one embodiment, the feedback channel group number determination module 210 is further configured to determine the number of data channels mapped to the first configured frequency domain in the first slot or the maximum number of data channels capable of being mapped to the first configured frequency domain in the first slot as the number of feedback channel groups.

In one embodiment, the data channel number determination module 220 is further configured to: if the number of subchannels included in each second slot is equal, determine the number of data channels mapped to the first configured frequency domain in the first slot according to the number of second slots and the number of subchannels included in each second slot; and if the number of subchannels included in each second slot is different, summing the number of subchannels included in each second slot, and determining the resulting sum as the number of data channels mapped to the first configured frequency domain in the first slot.

In one embodiment, the feedback channel group number determination module 210 is further configured to: determine the number of feedback channels according to the number of resource blocks included in the total bandwidth of all feedback channels in the resource pool and the number of resource blocks included in one feedback channel, or determine the number of feedback channels according to the number of resource blocks included in the total bandwidth of all feedback channels in the resource pool, the number of resource blocks included in one feedback channel, and the number of channels of one feedback channel in a code domain; and determine the number of feedback channels as the number of feedback channel groups.

In one embodiment, the feedback channel mapping module 230 is further configured to: order data channels, and order feedback channel groups; and map a feedback channel corresponding to each ordered data channel to the feedback channel groups.

In one embodiment, the feedback channel mapping module 230 is further configured to: if the number of data channels is equal to or less than the number of feedback channel groups, map the feedback channel(s) corresponding to each data channel to a respective one of the feedback channel groups in order until the data channels are mapped, and if the number of data channels is less than the number of feedback channel groups, map the feedback channel(s) corresponding to each data channel to a respective one of the feedback channel groups in order, and after the data channels are mapped, starting with the first one of the data channels again, map the feedback channel(s) corresponding to each data channel to a respective one of remaining feedback channel groups until each feedback channel group has the mapped feedback channel; or determine the number of feedback channel groups to which the feedback channel(s) corresponding to each data channel is mapped according to the number of data channels and the number of feedback channel groups, and map, according to the number of feedback channel groups to which the feedback channel(s) corresponding to each data channel is mapped, the feedback channel corresponding to each ordered data channel to at least one feedback channel group.

In one embodiment, the feedback channel mapping module 230 is further configured to: determine an ordering number of a feedback channel group to which the feedback channel(s) corresponding to each data channel is mapped according to the number of second slots and the number of data channels included in a second configured frequency domain in each second slot, and map the feedback channel (s) corresponding to each data channel to the feedback channel groups according to the ordering number.

In one embodiment, the feedback channel mapping module 230 is further configured to: order second slots, and order feedback channel groups; map each ordered second slot to the feedback channel groups; for at least one feedback channel group to which a current second slot is mapped, divide feedback channels included in the at least one feedback channel group into the set number of sub-feedback channel groups, where the set number is determined by the number of data channels of the current second slot in the second configured frequency domain and/or the number of the feedback channels included in the at least one feedback channel group; and map feedback channels corresponding to the current second slot to the sub-feedback channel groups, where the feedback channels corresponding to the second slot are feedback channels corresponding to data channels included in the second slot in the second configured frequency domain.

In one embodiment, the feedback channel mapping module 230 is further configured to: in condition that the number of second slots is equal to or less than the number of feedback channel groups, map each second slot to a respective one of the feedback channel groups in order until the second slots are mapped, and in condition that the number of second slots is less than the number of feedback channel groups, map each second slot to a respective one of the feedback channel groups in order, and after the second slots are mapped, starting with the first one of the second slots again, map each second slot to a respective one of remaining feedback channel groups until each feedback channel group has the mapped second slot; or determine the number of feedback channel groups to which each second slot is mapped according to the number of second slots and the number of feedback channel groups, and map, according to the number of feedback channel groups to which each second slot is mapped, each ordered second slot to at least one feedback channel group.

In one embodiment, the feedback channel mapping module 230 is further configured to: order data channels of the current second slot, and order sub-feedback channel groups; and map feedback channels corresponding to the ordered data channels of the current second slot to the sub-feedback channel groups.

In one embodiment, the feedback channel mapping module 230 is further configured to: in condition that the number of data channels of the current second slot is equal to or less than a set number, map a feedback channel(s) corresponding to each data channel of the current second slot to a respective one of the sub-feedback channel groups in order until the feedback channels corresponding to the current second slot are mapped, and in condition that the number of data channels of the current second slot is less than the set number, map the feedback channel(s) corresponding to each data channel of the current second slot to a respective one of the sub-feedback channel groups in order, and after the feedback channels corresponding to the current second slot are mapped, starting with a feedback channel corresponding to the first one of the data channels of the current second slot again, map the feedback channel(s) corresponding to each data channel of the current second slot to each of remaining sub-feedback channel groups until each sub-feedback channel group has the mapped feedback channel.

Figure 6:
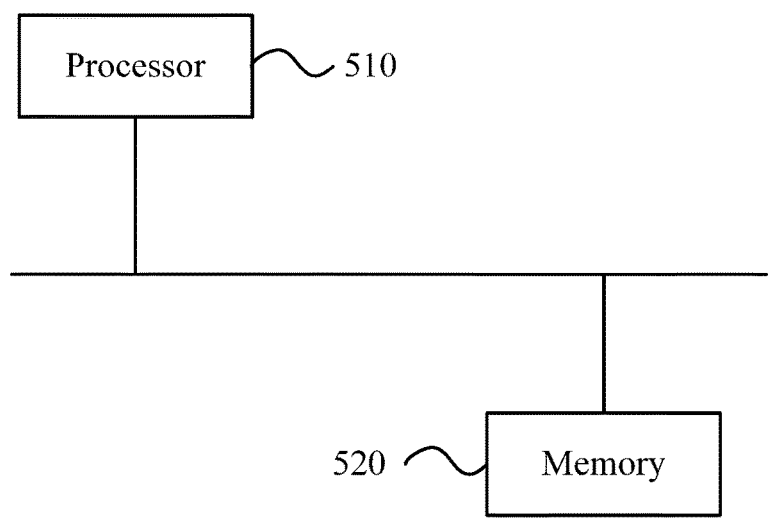
FIG. 6 is a structural diagram of an equipment according to an embodiment of the present application.

FIG. 6 is a structural diagram of an equipment according to an embodiment of the present application. As shown in FIG. 6, the equipment provided in the present application includes a processor 510 and a memory 520. The number of processors 510 in the equipment may be one or more, and FIG. 6 is illustrated by using an example in which there is one processor 510. The number of memories 520 in the equipment may be one or more, and FIG. 6 is illustrated by using an example in which there is one memory 520. The processor 510 and the memory 520 of the equipment are connected by a bus or in other manners, and FIG. 6 is illustrated by using an example of the connection by the bus.

In one embodiment, the equipment is a sending end. The sending end may be one of a scheduling node, a base station or a UE.

The memory 520, as a computer-readable storage medium, may be configured to store software programs and computer-executable programs and modules such as program instructions/modules corresponding to the equipment in any embodiment of the present application (such as a coding module and a first sending module in the data transmission apparatus). The memory 520 may include a program storage region and a data storage region, where the program storage region may store an operating system and an application program required by at least one function while the data storage region may store data created depending on use of the equipment. In addition, the memory 520 may include a high-speed random access memory, and may also include a nonvolatile memory such as at least one click memory, flash memory or another nonvolatile solid-state memory. In some examples, the memory 520 may further include memories located remotely relative to the processor 510, and these remote memories may be connected to the equipment via a network. The examples of the preceding network include, but are not limited to, the Internet, an intranet, a local area network, a mobile communication network, and a combination thereof.

The equipment provided above may be configured to execute the feedback channel mapping method provided in any embodiment described above, and has corresponding functions.

The program stored in the memory 520 may be a program instruction/module that corresponds to the feedback channel mapping method provided in the application embodiments of the present application. The processor 510 executes the software programs, instructions, and modules stored in the memory 520 so as to perform one or more function applications and data processing, that is, to implement the feedback channel mapping method described in the above method embodiments. It is to be understood that when the equipment is a receiving end, the equipment can execute the feedback channel mapping method provided in any embodiment of the present application, and has corresponding functions. The equipment may be one of a base station or a UE.

The embodiments of the present application further provide a storage medium including a computer-executable instruction which, when executed by a processor, implements the feedback channel mapping method. The method includes: determining the number of feedback channel groups divided in a first configured frequency domain in a first slot; determining the number of data channels mapped to the first configured frequency domain in the first slot, where a time domain interval between the first slot and a second slot where the data channel is located is greater than or equal to a first configured value, the second slot is a forward slot of the first slot, and a frequency domain range where the data channel is located is a second configured frequency domain; and mapping a feedback channel(s) corresponding to each data channel to the feedback channel group according to the number of the data channels and the number of the feedback channel groups.

It is to be understood by those skilled in the art that the term user equipment encompasses any suitable type of wireless user equipment, such as mobile phones, portable data processing devices, portable web browsers, or vehicle-mounted mobile stations.

Generally, various embodiments of the present application may be implemented in hardware or special purpose circuits, software, logic or any combination thereof. For example, some aspects may be implemented in hardware while other aspects may be implemented in firmware or software that may be executed by a controller, microprocessor, or other computing devices, although the present application is not limited thereto.

The embodiments of the present application may be implemented by a data processor of a mobile device executing computer program instructions, for example in a processor entity, or by hardware, or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow in the drawings of the present application may represent program steps, or may represent interconnected logic circuits, modules, and functions, or may represent a combination of program steps and logic circuits, modules, and functions. The computer programs may be stored on a memory. The memory may be of any type suitable to the local technical environment and may be implemented using any suitable data storage technology such as, but not limited to, a read-only memory (ROM), a random access memory (RAM), an optical memory device and system (digital video disc (DVD) or compact disc (CD)), and the like. The computer-readable medium may include a non-transitory storage medium. The data processor may be of any type suitable to the local technical environment which, such as but not limited to, a general purpose computer, a special purpose computer, a microprocessor, a digital signal processing (DSP), an application specific integrated circuit (ASIC), a field-programmable gate array (FGPA), and a processor based on a multi-core processor architecture.

What is claimed is:

1. A feedback channel mapping method, comprising:
   obtaining a number of feedback channel groups divided in a first configured frequency range in a first time slot;
   determining a number of data channels associated with the first configured frequency range in the first time slot, wherein a time domain interval between the first time slot and a second time slot where the data channels are located is greater than or equal to a first configured value, the second time slot preceding the first time slot and the data channels being located is a second configured frequency range; and
   mapping feedback channels of the feedback channel groups to the data channels according to at least the number of the data channels,
   wherein determining the number of data channels associated with the first configured frequency range in the first time slot comprises:
      in response to a number of subchannels comprised in each of a plurality of second time slots being equal, determining the number of data channels associated with the first configured frequency range in the first time slot according to a number of the plurality of second time slots and the number of subchannels comprised in each of the plurality of second time slots by:
      determining the number of data channels associated with the first configured frequency range in the first time slot as being equal to (the number of the plurality of second time slots)×(the number of subchannels comprised in each of the plurality of second time slots).

2. The method of claim 1, wherein obtaining the number of feedback channel groups comprises:
   obtaining the number of feedback channel groups according to the number of data channels mapped to the first configured frequency range in the first time slot.

3. The method of claim 2, wherein the first configured frequency range comprises a total bandwidth of all feedback channels in a resource pool, and the second configured frequency range comprises a total bandwidth of all data channels in the resource pool.

4. The method of claim 1, wherein mapping the feedback channels of the feedback channel groups to the data channels comprises:
   mapping the feedback channels of the feedback channel groups according to an order of the data channels.

5. The method of claim 1, wherein mapping the feedback channels comprises:
   determining an ordering number of a feedback channel group to which the feedback channel is mapped according to a number of second time slots and a number of data channels comprised in a second configured frequency range in each of the second time slots; and
   mapping the feedback channel of the feedback channel groups according to the ordering number.

6. The method of claim 1, wherein the feedback channel groups comprise a same number of feedback channels.

7. A communication equipment, comprising a memory, a processor, and a computer program stored in the memory and executable by the processor, wherein the processor, when executing the computer program, is configured to cause the communication equipment to perform steps comprising:
   obtaining a number of feedback channel groups divided in a first configured frequency range in a first time slot;
   determining a number of data channels associated with the first configured frequency range in the first time slot, wherein a time domain interval between the first time slot and a second time slot where the data channels are located is greater than or equal to a first configured value, the second time slot preceding the first time slot and the data channels being located in a second configured frequency range; and
   mapping feedback channels of the feedback channel groups to the data channels according to at least the number of the data channels,
   wherein determining the number of data channels associated with the first configured frequency range in the first time slot comprises:
      in response to a number of subchannels comprised in each of a plurality of second time slots being equal, determining the number of data channels associated with the first configured frequency range in the first time slot according to a number of the plurality of second time slots and the number of subchannels comprised in each of the plurality of second time slots by:
      determining the number of data channels associated with the first configured frequency range in the first time slot as being equal to (the number of the plurality of second time slots)×(the number of subchannels comprised in each of the plurality of second time slots).

8. The communication equipment of claim 7, wherein the processor is configured to cause the communication equipment to obtain the number of feedback channel groups by:

obtaining the number of feedback channel groups according to the number of data channels mapped to the first configured frequency range in the first time slot.

9. The communication equipment of claim 8, wherein the first configured frequency range comprises a total bandwidth of all feedback channels in a resource pool, and the second configured frequency range comprises a total bandwidth of all data channels in the resource pool.

10. The communication equipment of claim 7, wherein the processor is configured to cause the communication equipment to map the feedback channels by: mapping the feedback channels of the feedback channel groups to the data channels further according to an order of the data channels.

11. The communication equipment of claim 7, wherein the processor is configured to cause the communication equipment to map the feedback channels by:
   determining an ordering number of a feedback channel group to which the feedback channel is mapped according to a number of second time slots and a number of data channels comprised in a second configured frequency range in each of the second time slots; and
   mapping the feedback channel of the feedback channel groups according to the ordering number.

12. The communication equipment of claim 7, wherein the feedback channel groups comprise a same number of feedback channels.

13. A non-transitory computer-readable storage medium, storing a computer program which, when executed by a processor, is configured to perform steps comprising:
   obtaining a number of feedback channel groups divided in a first configured frequency range in a first time slot;
   determining a number of data channels associated with the first configured frequency range in the first time slot, wherein a time domain interval between the first time slot and a second time slot where the data channels are located is greater than or equal to a first configured value, the second time slot preceding the first time slot and the data channels being located in a second configured frequency range; and
   mapping feedback channels of the feedback channel groups to the data channels according to at least the number of the data channels,
   wherein determining the number of data channels associated with the first configured frequency range in the first time slot comprises:
      in response to a number of subchannels comprised in each of a plurality of second time slots being equal, determining the number of data channels associated with the first configured frequency range in the first time slot according to a number of the plurality of second time slots and the number of subchannels comprised in each of the plurality of second time slots by:
   determining the number of data channels associated with the first configured frequency range in the first time slot as being equal to (the number of the plurality of second time slots)×(the number of subchannels comprised in each of the plurality of second time slots).

14. The non-transitory computer-readable storage medium of claim 13, wherein the computer program is configured to obtain the number of feedback channel groups by: obtaining the number of feedback channel groups according to the number of data channels mapped to the first configured frequency range in the first time slot.

15. The non-transitory computer-readable storage medium of claim 14, wherein the first configured frequency range comprises a total bandwidth of all feedback channels in a resource pool, and the second configured frequency range comprises a total bandwidth of all data channels in the resource pool.

16. The non-transitory computer-readable storage medium of claim 13, wherein the computer program is configured to map the feedback channels by: mapping the feedback channels of the feedback channel groups to the data channels further according to an order of the data channels.

17. The non-transitory computer-readable storage medium of claim 13, wherein the feedback channel groups comprise a same number of feedback channels.

* * * * *